2,868,741
WATER BASE STENCIL DUPLICATING INK

Thomas Seal Chambers, Chicago, and Robert Thompson Florence, Park Ridge, Ill., assignors to A. B. Dick Company, Niles, Ill., a corporation of Illinois No Drawing. Application January 30, 1952
Serial No. 269,118

11 Claims. (Cl. 260—17)

This invention relates to stencil duplicating inks adapted particularly for use with rotary stencil duplicating machines or in other stencilling operations wherein ink is transferred through stencil openings to an impression medium.

Most of the stencil duplicating inks which have heretofore been produced have been formulated with an oil base to give, among other things, body and flow of the desired character. Such body and flow characteristics comprise a balance between sufficient flow for enabling the ink to distribute quickly and uniformly through the ink pad and for effecting transmission through the stencil to the impression medium, but not so much flow as will enable the ink to drip or to run from the ink pad or flood the stencil.

Oil base inks, as a general rule, have been found undesirable in many instances by reason of the fact that large amounts of oil present apparently cause a highly objectionable degree of set-off or smear unless special precautions, such as interlayers, are employed in handling the impression medium. These objectionable features stem from the fact that the oils used are generally non-drying in character. As a result, reliance is had upon rapid absorption of the oil vehicle into the impression medium for drying. This limits the use of oil base inks to highly absorbent sheet stock or copy paper. The ink absorbed into the impression medium is also responsible for the objectionable oily letter outline, hereinafter referred to as "halo" that is often secured in duplication with oil base inks. The above merely illustrates some of the objectionable features characteristic of oil base stencil duplicating inks.

It is an object of this invention to produce a new and improved stencil duplicating ink.

It is another object to produce an oil-free duplicating ink characterized by the desired balance between flow characteristics and body, and it is a related object to produce a stencil duplicating ink which is not limited to use with highly absorbent impression media; which is sufficiently rapid drying to enable use without the necessity of supplying interlayers to minimize smear or set-off; and which, upon drying, is substantially resistant to moisture or other substances with which the copy might subsequently come in contact.

A further object is to produce a rapid drying water base stencil duplicating ink.

In accordance with the practice of this invention, a stencil duplicating ink is formulated to contain a tinctorial or a coloring agent, water as the principal diluent, a water-soluble, relatively high molecular weight compound to impart body to the ink composition and flow of the desired character, and an aqueous dispersion of a water-insoluble organic material preferably in the form of a polymer of resinous or rubber-like material which serves as a protective agent for the copy upon drying. Incidentally, some body may be derived from the dispersion, especially when present in high concentrations in the ink composition.

As the tinctorial or coloring agent, use may be made of water-soluble dye such as Nigrosine dye of the type Nigrosine W. S. J. Use may also be made of other water-soluble acid and basic dyes such as triphenylmethane, Rhodamine B, thioflavine, and auramine dyes, or sulfonated triphenylmethane, quinone-imide and xanthone dyes. Representative of the acid dyes which have been successfully used are materials such as are marketed by the Calco Chemical Company, a division of the American Cyanamid Company, under the trade name Calcocids, which include the mono-, di-, and trisodium sulfonate derivatives of nitro, azo, pyrazoline, quinoline, triphenylmethol, diphenylnaphthol, methane, azine, xanthone and anthroquinone groups. To a limited extent, the azo dyes may also be incorporated as the coloring agent in ink formulations of the type described. Instead of dye compounds, dispersions of pigments may be used in which the pigment may comprise lamp black, malachite green, iron blue, cadmium yellow, and other coloring inorganic pigments and organic dyes.

The preferred substances of high molecular weight may be selected of water soluble cellulose ethers and esters and derivatives thereof, and salts thereof such as hydroxyethyl cellulose (Cellosize), methyl cellulose (Methocel), sodium carboxy methyl cellulose and partially alkylated cellulose having less than one-third of the available hydroxy groups alkylated. With some of the less soluble partially alkylated cellulose derivatives, a suitable stable solution of the desired character may be formed by the use of slightly alkaline aqueous medium.

Instead of the water-soluble cellulose ethers and esters, water-soluble materials may be used such, for example, as the carbohydrates of the type starch, sugars, dextrose, alginates, and the like; proteins such as gelatine, glue, casein, zein, and the like; natural resins and gums of the type gum tragacanth, karaya gum, and the like; polyethylene glycols having a molecular weight ranging from 1,000 to 15,000 or more, and their chlorinated derivatives; water-soluble resinous materials such as phenol formaldehyde resin forming materials which include resorcinol, xylenol, cresol, phenol, and the like, reacted to an intermediate water-soluble stage of polymeric growth with an aldehyde such as formaldehyde; and amino-aldehyde resinous materials such as the intermediate reaction products of urea or malamine with formaldehyde, and polyvinyl alcohol. Though not equivalent, water-soluble inorganic bodying agents of the type alkali and metal silicates such as sodium silicate, may also be used.

Proper concentration of the bodying agent required to impart the desired balance in flow characteristics depends largely upon the average molecular weight of the specific compound, the arrangement and the type of constituent groups of which the compound is formed, and the materials with which the bodying agent is associated in solution. It is convenient to define the concentration of bodying agent as the amount capable of providing for a viscosity in the ink composition equivalent to a measurement of 35 to 150 seconds determined with a Stormer viscosimeter with a center baffle and with a thermometer well, under a 215 gram load at 20° C.

In the practice of our invention, the desired viscosity will result from the use of about 2 to 20% by weight polyvinyl alcohol or 1 to 15% by weight hydroxyethyl cellulose or other water-soluble cellulose ethers and esters, or 0.4 to 5% by weight water-soluble salts of cellulose ethers and esters such as sodium carboxymethyl cellulose, or 20 to 50% by weight urea or phenol formaldehyde resin forming material reacted to an intermediate stage of polymeric growth, or 25 to 60% by weight polyethylene glycol, or 1 to 5% by weight alginate, or 2 to 10% by weight casein. The viscosity range is not to be taken as a strict limitation, because it will be understood that flow requirements may change in relation to modifications in duplicating machines and the requirements thereof, so that the amount of bodying agent may change accordingly without departing from the spirit of the invention.

Suitable resinous and rubber-like materials for use in aqueous dispersions embodied in ink compositions in accordance with the practice of this invention may be selected of such materials as the polyvinyl derivatives, which include polyvinyl acetate, polyvinyl chloride, vinyl acetate-vinyl chloride copolymer, polyvinyl acetal, polyvinylidene chlorides and copolymers thereof with vinyl acetates, vinyl chlorides, and acrylates. Use may also be made of polymeric derivatives of acrylic acid such as the polyacrylates and polyalkyl acrylates, which include methyl methacrylate, ethyl methacrylate, butyl methacrylate, ethyl acrylate, butyl acrylate, and the like. Other water-insoluble resinous materials which may be used in dispersion include polystyrene, polybutylene, polyethylene, polytetrafluoroethylene, rosin, Vinsol, and latices formed of natural and synthetic rubbers and rubber-like materials represented by butadiene-acrylonitrile copolymers (Buna-N), butadiene-styrene copolymers (Buna-S), rubber hydrochloride, chlorinated rubber, and the like.

The insolubilizing polymeric resinous or rubber-like materials in dispersions should usually be employed in concentrations to provide solids ranging from 5 to 35% by weight of the ink composition, depending upon the type and viscosity characteristics of the particular resin or rubber material. For instance, concentrations in the higher range of 20 to 35% have been found most desirable for resinous materials of the type polyacrylates and, a pinewood resin produced by extracting resinous wood with a coal tar hydrocarbon, removing said hydrocarbon by evaporation, extracting the residue with a petroleum hydrocarbon and recovering a gasoline-insoluble resin, while concentrations ranging from 10 to 25% by weight are most desirable for resinous derivatives which include the polyvinyl derivatives and rubber latices, with or without plasticizing. Within these concentrations, the dispersed substance will generally have little effect upon the viscosity or flow of the ink composition so that it will depend primarily upon the water soluble resinous materials or high molecular weight substances for bodying.

The penetrability of the ink composition into the impression paper for more rapid drying may be increased by the use of wetting agents. A suitable wetting agent may be selected from the group of materials consisting of the dioctyl esters of sodium sulfosuccinate, quaternary ammonium compounds and their salts, and the fatty acid amines and their salts, triphenyl sodium disulfonates, sulfonated ethers, fatty alcohol sulfates such as sorbitan monolaurate, stearate or oleate, alkyl aryl sulfonates, and polyoxyethylene derivatives of fatty acids such as sorbitan monolaurate, palmitate or stearate polyoxyethylene derivative, and the like. Less than 2% by weight of wetting agent is ordinarily sufficient to impart the desired wetting characteristics, although more may be used, if desired. The wetting agent may function incidentally to stabilize the dispersion in the ink composition.

Further improvements in the ink composition may be secured by the addition of a liquid humectant which is compatible with the solution of water-soluble bodying substance and aqueous dispersion. The humectant minimizes the tendency of the ink to dry too rapidly before transfer to the impression medium even under conditions of high temperature and low humidity. It also appears to provide for a more flexible and adherent base for the coloring agent after the diluent has been removed so as to increase the wet strength and moisture resistance of the copy. These properties may be derived by the addition of a polyhydric alcohol, such as glycerine, ethylene glycol, diethylene glycol, triethylene glycol, polyethylene glycol, and other glycols, or by related substances of the type alkylol amines, such as diethanol amine, triethanol amine, acetyl amine, n-formyl ethanol amine, monoethanol amine sulfamate, and the like.

In the presence of water-soluble cellulose ethers and esters, such as hydroxyethyl cellulose, the polyglycols and related substances have the unique characteristic of modifying the flow properties of the ink composition. Such modification in flow is not apparently measurable by viscosimeters operating at high rates of sheer, but exists to the extent that leakage of the ink from the ink pad is markedly reduced and duplication is substantially simplified. Under high sheer, such as the forces developed by the Stormer viscosimeter, or the sheering forces operating while the ink is being forced through the stencil openings, the increased flow properties are not apparent and the ink flows as a liquid which seemingly has little additional viscosity.

In specific application, 1 to 25% by weight of the humectant may be embodied with materials of the type hydroxyethyl cellulose of medium viscosity, while amounts up to 40% by weight are preferably used with the same type of material of higher viscosity grade. In the same sense, corresponding amounts of other polyhydric alcohols and related humectants may be used with other bodying agents, the upper limit of concentration being that at which the structure and stability of the colloid composition is unfavorably affected.

It has also been found that the insolubilization of the ink composition on the copy may be vastly increased when the ink composition is formulated with a bodying agent having a hydroxy or amino group capable of the acetal reaction and is provided with an aldehyde latent under aqueous conditions but which is capable of the acetal reaction to insolubilize the water-soluble bodying agent upon drying. Glyoxal is representative of such latent reactivity.

Glyoxal and related substances such as pyruvic aldehyde are effective when used in amounts up to 5% by weight of the ink composition or 5 to 20% by weight based upon the amount of bodying substance.

By way of illustration, but not by way of limitation, examples are hereinafter set forth which illustrate the practice of this invention.

*Example I*

[All percentages shown are by weight.]

16% carbon black in 40% aqueous dispersion
2% wetting agent (dioctyl ester of sodium sulfosuccinate in 50% solution)
40% polyvinyl chloride in 55% aqueous dispersion
42% hydroxyethyl cellulose (high viscosity grade) in 10% water solution (400 to 500 cps. in 5% solution at 20° C.)

*Example II*

15% carbon black in 40% aqueous dispersion
2% glyoxal in 30% solution alcohol
41% polyvinyl chloride in 55% aqueous dispersion
40% hydroxyethyl cellulose in 10% water solution of high viscosity grade
1% wetting agent

*Example III*

9% carbon black (40% aqueous dispersion)
2% glyoxal (30% solution)
34% methyl methacrylate (45% aqueous dispersion)
36% hydroxyethyl cellulose (10% of medium viscosity, 75 to 125 cps. in 5% solution at 20° C.)
12% diethylene glycol
7% water

*Example IV*

7% Nigrosine water-soluble dye
40% acrylic acid derivative polymer (25% aqueous dispersion)

45% hydroxyethyl cellulose (10% water solution, medium viscosity grade)
8% water

Example V

5% Calcocid Scarlet MOO water-soluble dye (an acid dye)
2% wetting agent (dioctyl ester of sodium sulfosuccinate in 50% solution)
46.5% casein vehicle[1]
45.5% polystyrene (molecular weight 80,000 in 42% water dispersion)

[1] (Casein 10.8%, borax 1.1%, ammonium hydroxide 1.1%, water 87.0%.)

Example VI

5% Calcocid Scarlet water-soluble dye (an acid dye)
2% wetting agent
46.5% casein vehicle[1]
46.5% polyvinylidene chloride plasticized with 20% dibutylphthalate in 52% water dispersion.

[1] See footnote—Example V.

Example VII

5% Calcocid Scarlet water-soluble dye (an acid dye)
2% Aerosol O. T. wetting agent (dioctyl ester of sodium sulfosuccinate in 50% solution)
46.5% casein vehicle[1]
46.5% styrene-butadiene copolymer in 48% water dispersion.

[1] See footnote—Example V.

Example VIII

5% Calcocid Scarlet water-soluble dye (an acid dye)
2% Aerosol O. T. wetting agent (dioctyl ester of sodium sulfosuccinate in 50% solution)
46.5% casein vehicle[1]
46.5% perbunan G latex (40% solids) (a butadiene-acrylonitrile copolymer)

[1] See footnote—Example V.

Example IX

5% Calcocid Scarlet water-soluble dye (an acid dye)
2% wetting agent
36.5% casein vehicle[1]
36.5% polystyrene (molecular weight 80,000) in 42% water dispersion
20% ethylene glycol

[1] See footnote—Example V.

Example X

5% Calcocid Scarlet water-soluble dye (an acid dye)
2% wetting agent (50% solids)
46.5% methyl cellulose vehicle (2.5% methyl cellulose of 100 cps. in water)
46.5% polystyrene (molecular weight 80,000) in 42% water dispersion

Example XI

5% Calcocid Scarlet water-soluble dye (an acid dye)
2% wetting agent (50% solids)
46.5% methyl cellulose vehicle (2.5% solids)
46.5% acrylic polymer in 25% aqueous dispersion

Example XII

5% Calcocid Scarlet water-soluble dye (an acid dye)
2% Aerosol O. T. (50% solution)
10% ethylene glycol
18.3% hydroxyethyl cellulose (10 solution in water) (medium viscosity grade)
64.7% Vinsol emulsion (40% dispersion in water)

Example XIII

5% Calcocid Scarlet water-soluble dye (an acid dye)
2% wetting agent (50% solids)
10% ethylene glycol
33.8% polyvinyl alcohol (10% solution in water)
32.3% polyvinyl acetate (55% dispersion in water)
16.9% water

Example XIV

5% Calcocid Scarlet water-soluble dye (an acid dye)
2% wetting agent (50% solids)
41.9% sodium carboxymethyl cellulose (1% solution in water)
40.4% polyvinyl acetate (55% dispersion in water)
10.7% water

Example XV

4% Calcocid Scarlet water-soluble dye (an acid dye)
1% wetting agent
41% casein vehicle[1]
41% polyvinyl butyral (65% dispersion in water)
13% water

[1] See footnote—Example V.

Example XVI

15% water-dipersible carbon black pigment
40% Acrysol W-66, polyacrylic acid polymer (25% dispersion in water)
45% hydroxyethyl cellulose (medium viscosity grade) in 10% solution

Example XVII

15% water-dispersible carbon black pigment
1% wetting agent
1% sodium alginate
41% Geon latex polyvinyl chloride (55% dispersion in water)
42% water In the duplicating inks set forth in the above examples, flow is derived generally from the bodying agent and, upon transmission to the impression medium, drying occurs substantially immediately by absorption of the aqueous diluent into the interstices between the fibers and into the pores of the fibers and from there the diluent soon evaporates into the atmosphere. Such rapid setting of the ink composition permits satisfactory duplication on hard or highly-finished paper stock without having to resort to complicated techniques such as the use of interlayers to cope with the problems of smear and set-off heretofore encountered with oily base stencil duplicating inks.

It will be apparent that upon drying the resinous material dispersed in the ink composition will become integrated with the base and will have the effect of protecting the base from the effects of moisture, solvents, and greases or other substances with which the copy might come in contact as an incidence to normal use. It will be understood that the basic substances with a minimum amount of water may be prepared for market in concentrated or paste form, to be diluted at the station of use with the required amount of water before introduction to the duplicating machine, and that such pastes or concentrates also embody the inventive concepts of this invention.

It will be further understood that changes and substitutions in materials and in amounts may be made without departing from the spirit of the invention, especially as defined in the following claims:

We claim:

1. A water base stencil duplicating ink comprising water as the major diluent, a tinctorial agent present in an amount sufficient to provide legibility to the copy, more than 1 percent by weight of a water soluble high molecular weight organic substance constituted with groupings selected from the group consisting of hydroxy and amino groups and dissolved in the aqueous medium to provide an adherent base upon drying and to body the ink composition, said water soluble high molecular weight organic substance being present in an amount to provide a viscosity to the ink composition corresponding to 35–150 seconds as measured by a Stormer viscosimeter under a 200 gram load at 20° C. with center baffle and with a thermometer well, and from 5–35 percent by weight of a water insoluble resinous compound dispersed in the water solution of the water soluble high molecular weight substance and selected from the group consisting of polyvinyl acetate, polyvinyl chloride, vinyl acetate-vinyl chloride copolymer, polyvinyl acetal, polyvinylidene chloride, vinylidene chloride-vinyl acetate copolymer, polyvinylidene chloride-vinyl acetate copolymer, polyvinylidene chloride-vinyl chloride copolymer, vinylidene chloride-alkyl acrylate copolymer in which the alkyl group contains from 1–4 carbon atoms, polyalkyl acrylates in which the alkyl group contains from 1–4 carbon atoms, polystyrene, polybutylene, polyethylene, polytetrafluoroethylene, rosin, butadiene-acrylonitrile copolymer, butadiene-styrene copolymer, rubber hydrochloride and chlorinated rubber.

2. A stencil duplicating ink as claimed in claim 1 in which the water insoluble resinous compound dispersed in the aqueous medium comprises 20–35 percent by weight of a polyalkyl acrylate in which the alkyl group contains from 1–4 carbon atoms.

3. A stencil duplicating ink as claimed in claim 1 in which the water insoluble resinous compound dispersed in the aqueous medium comprises 10–35 percent by weight of a polystyrene.

4. A stencil duplicating ink as claimed in claim 1 in which the water insoluble resinous compound dispersed in the aqueous medium comprises 10–35 percent by weight of a polyisobutylene.

5. A stencil duplicating ink as claimed in claim 1 in which the water insoluble resinous compound dispersed in the aqueous medium comprises 10–35 percent by weight of a polyethylene.

6. A water base stencil duplicating ink comprising water as the major diluent, a tinctorial agent present in an amount sufficient to provide legibility to the copy, a water soluble high molecular weight organic substance constituted with groupings selected from the group consisting of hydroxy and amino groups and dissolved in the aqueous medium to provide an adherent base upon drying and to body the ink composition, said water soluble high molecular weight organic substance being present in an amount to provide a viscosity to the ink composition corresponding to 35–150 seconds as measured by a Stormer viscosimeter under a 200 gram load at 20° C. with center baffle and with a thermometer well, from 5–35 percent by weight of a water insoluble resinous compound dispersed in the water solution of the water soluble high molecular weight substance and selected from the group consisting of polyvinyl acetate, polyvinyl chloride, vinyl acetate-vinyl chloride copolymer, polyvinyl acetal, polyvinylidene chloride, vinylidene chloride-vinyl acetate copolymer, polyvinylidene chloride-vinyl acetate copolymer, polyvinylidene chloride-vinyl chloride copolymer, vinylidene chloride-alkyl acrylate copolymer in which the alkyl group contains from 1–4 carbon atoms, polyalkyl acrylates in which the alkyl group contains from 1–4 carbon atoms, polystyrene, polybutylene, polyethylene, polytetrafluoroethylene, rosin, butadiene-acrylonitrile copolymer, butadiene-styrene copolymer, rubber hydrochloride and chlorinated rubber, a humectant compatible with the water solution of the bodying substance and incapable of destroying the structure and the stability of the ink composition and in which the humectant is selected from the group consisting of a liquid polyhydric alcohol and a liquid alkylamine, and an aldehyde selected from the group consisting of glyoxal and pyruvic aldehyde.

7. A water base stencil duplicating ink comprising water as the major diluent, a tinctorial agent present in an amount sufficient to provide legibility to the copy, more than 1 percent by weight of a water soluble high molecular weight organic substance constituted with groupings selected from the group consisting of hydroxy and amino groups and dissolved in the aqueous medium to provide an adherent base upon drying and to body the ink composition, from 5–35 percent by weight of a water insoluble resinous compound dispersed in the water solution of the water soluble high molecular weight substance and selected from the group consisting of polyvinyl acetate, polyvinyl chloride, vinyl acetate-vinyl chloride copolymer, polyvinyl acetal, polyvinylidene chloride, vinylidene chloride-vinyl acetate copolymer, polyvinylidene chloride-vinyl acetate copolymer, polyvinylidene chloride-vinyl chloride copolymer, vinylidene chloride-alkyl acrylate copolymer in which the alkyl group contains from 1–4 carbon atoms, polyalkyl acrylates in which the alkyl group contains from 1–4 carbon atoms, polystyrene, polybutylene, polyethylene, polytetrafluoroethylene, rosin, butadiene-acrylonitrile copolymer, butadiene-styrene copolymer, rubber hydrochloride and chlorinated rubber, a humectant compatible with the water solution of the bodying substance and incapable of destroying the structure and stability of the ink composition and in which the humectant is selected from the group consisting of a liquid polyhydric alcohol and a liquid alkylamine and present in an amount up to 40 percent by weight, and an aldehyde selected from the group consisting of glyoxal and pyruvic aldehyde present in an amount up to 20 percent by weight.

8. A water base stencil duplicating ink comprising water as the major diluent, a tinctorial agent present in an amount sufficient to provide legibility to the copy, more than 1 percent by weight of a water soluble high molecular weight organic substance constituted with groupings selected from the group consisting of hydroxy and amino groups and dissolved in the aqueous medium to provide an adherent base upon drying and to body the ink composition, said water soluble high molecular weight organic substance being present in an amount to provide a viscosity to the ink composition corresponding to 35–150 seconds as measured by a Stormer viscosimeter under a 200 gram load at 20° C. with center baffle and with a thermometer well, from 5–35 percent by weight of a water insoluble resinous compound dispersed in the water solution of the water soluble high molecular weight substance and selected from the group consisting of polyvinyl acetate, polyvinyl chloride, vinyl acetate-vinyl chloride copolymer, polyvinyl acetal, polyvinylidene chloride, vinylidene chloride-vinyl acetate copolymer, polyvinylidene chloride-vinyl acetate copolymer, polyvinylidene chloride-vinyl chloride copolymer, vinylidene chloride-alkyl acrylate copolymer in which the alkyl group contains from 1–4 carbon atoms, polyalkyl acrylates in which the alkyl group contains from 1–4 carbon atoms, polystyrene, polybutylene, polyethylene, polytetrafluoroethylene, rosin, butadiene-acrylonitrile copolymer, butadiene-styrene copolymer, rubber hydrochloride and chlorinated rubber, and a liquid polyhydric alcohol present in an amount up to 20 percent by weight.

9. A water base stencil duplicating ink comprising water as the major diluent, a tinctorial agent present in an amount sufficient to provide legibility to the copy, more than 1 percent by weight of a water soluble high molecular weight organic substance constituted with groupings selected from the group consisting of hydroxy and amino groups and dissolved in the aqueous medium to provide an adherent base upon drying and to body the ink composition, said water soluble high molecular weight organic substance being present in an amount to provide a viscosity to the ink composition corresponding to 35–150 seconds as measured by a Stormer viscosimeter under a 200 gram load at 20° C. with center baffle and with a thermometer well, from 5–35 percent by weight of a water insoluble resinous compound dispersed in the water solution of the water soluble high molecular weight substance and selected from the group consisting of polyvinyl acetate, polyvinyl chloride, vinyl acetate-vinyl chloride copolymer, polyvinyl acetal, polyvinylidene chloride, vinylidene chloride-vinyl acetate copolymer, polyvinylidene chloride-vinyl acetate copolymer, polyvinylidene chloride-vinyl chloride copolymer, vinylidene chloride-alkyl acrylate copolymer in which the alkyl group contains from 1-4 carbon atoms, polyalkyl acrylates in which the alkyl group contains from 1-4 carbon atoms, polystyrene, polybutylene, polyethylene, polytetrafluoroethylene, rosin, butadiene-acrylonitrile copolymer, butadiene-styrene copolymer, rubber hydrochloride and chlorinated rubber, and an aldehyde selected from the group consisting of glyoxal and pyruvic aldehyde present in an amount up to 20 percent by weight.

10. A water base stencil duplicating ink comprising water as the major diluent present in an amount greater than 50 percent by weight, a tinctorial agent present in an amount to provide legibility to the copy, from 1-15 percent by weight of a water soluble bodying agent selected from the group consisting of cellulose ethers and cellulose esters, and from 5-35 percent by weight of a water insoluble resinous compound dispersed in the aqueous medium and selected from the group consisting of polyvinyl acetate, polyvinyl chloride, vinyl acetate-vinyl chloride copolymer, polyvinyl acetal, polyvinylidene chloride, vinylidene chloride-vinyl acetate copolymer, polyvinylidene chloride-vinyl acetate copolymer, polyvinylidene chloride-vinyl chloride copolymer, vinylidene chloride-alkyl acrylate copolymer in which the alkyl group contains from 1-4 carbon atoms, polyalkyl acrylates in which the alkyl group contains from 1-4 carbon atoms, polystyrene, polybutylene, polyethylene, polytetrafluoroethylene, rosin, butadiene-acrylonitrile copolymer, rubber hydrochloride and chlorinated rubber.

11. A water base stencil duplicating ink comprising water as the major diluent present in an amount greater than 50 percent by weight, a tinctorial agent present in an amount to provide legibility to the copy, from 3-20 percent by weight polyvinyl alcohol, and from 5-35 percent by weight of a water insoluble resinous compound dispersed in the aqueous medium and selected from the group consisting of polyvinyl acetate, polyvinyl chloride, vinyl acetate-vinyl chloride copolymer, polyvinyl acetal, polyvinylidene chloride, vinylidene chloride-vinyl acetate copolymer, polyvinylidene chloride-vinyl acetate copolymer, polyvinylidene chloride-vinyl chloride copolymer, vinylidene chloride-alkyl acrylate copolymer in which the alkyl group contains from 1-4 carbon atoms, polyalkyl acrylates in which the alkyl group contains from 1-4 carbon atoms, polystyrene, polybutylene, polyethylene, polytetrafluorotheylene, rosin, butadiene-acrylonitrile copolymer, rubber hydrochloride and chlorinated rubber.

References Cited in the file of this patent

UNITED STATES PATENTS

| | | |
|---|---|---|
| 2,091,966 | Davidson | Sept. 7, 1937 |
| 2,114,393 | Lane | Apr. 19, 1938 |
| 2,128,672 | Gessler | Aug. 30, 1938 |
| 2,235,798 | Collings et al. | Mar. 18, 1941 |
| 2,275,582 | Catlon | Mar. 10, 1942 |
| 2,308,763 | Little | Jan. 19, 1943 |
| 2,321,270 | Bacon | June 8, 1943 |
| 2,346,969 | Jenck | Apr. 18, 1944 |
| 2,357,927 | Berg | Sept. 12, 1944 |
| 2,412,200 | Blum | Dec. 10, 1946 |
| 2,436,954 | Denton | Mar. 2, 1948 |
| 2,447,462 | Harsh | Aug. 17, 1948 |
| 2,543,718 | Cassel | Feb. 27, 1951 |
| 2,556,902 | Chambers et al. | June 12, 1951 |